United States Patent

Kajikawa et al.

[11] Patent Number: 4,654,675
[45] Date of Patent: Mar. 31, 1987

[54] PAPER FEEDING DEVICE FOR AUTOMATIC DRAFTING MACHINE

[75] Inventors: Osamu Kajikawa; Akio Toyama, both of Tokyo, Japan

[73] Assignee: Mutoh Industry Ltd., Tokyo, Japan

[21] Appl. No.: 741,892

[22] Filed: Jun. 6, 1985

[30] Foreign Application Priority Data

Jun. 27, 1984 [JP] Japan ................... 59-132417

[51] Int. Cl.$^4$ ................ G01D 15/24; B65H 23/08
[52] U.S. Cl. ................................... 346/134; 226/195
[58] Field of Search ............... 346/134; 271/272, 273, 271/274; 226/195

[56] References Cited

U.S. PATENT DOCUMENTS

| | | | |
|---|---|---|---|
| 2,246,003 | 6/1941 | Rich | 346/134 |
| 3,326,156 | 3/1965 | Cobble | 226/195 |
| 4,153,918 | 5/1979 | Jenkins | 226/195 |
| 4,216,482 | 8/1980 | Mason | 346/134 |
| 4,341,335 | 7/1982 | Schmid | 226/195 |

Primary Examiner—E. A. Goldberg
Assistant Examiner—Mark Reinhart
Attorney, Agent, or Firm—Wenderoth, Lind & Ponack

[57] ABSTRACT

A paper feeding device for automatic drafting machine in which paper is fed in a predetermined direction by drive rollers and pressure rollers that are in resilient contact with the drive rollers. A writing implement is shiftably disposed in a right angle direction to the feeding direction of the paper, and the writing implement abuts on the paper. A predetermined pattern is drawn on the paper by mutual operations of the transfer of the writing implement and the transfer of the paper in the feeding direction. Underlay rollers are disposed in parallel to the transfer path immediately below the transfer path of the writing implement. The direction of drive and rotation of the underlay rollers is identical with that of the drive rollers, and a circumferential speed of the surfaces of the underlay rollers is set slightly higher than a circumferential speed of the drive rollers.

9 Claims, 8 Drawing Figures

PAPER FEEDING DEVICE FOR AUTOMATIC DRAFTING MACHINE

BACKGROUND OF THE INVENTION

This invention relates to a so called pinch roller type paper feeding automatic drafting machine in which idle rollers are placed in pressure contact with drive rollers to feed paper in a reciprocating direction, and more particularly to a paper feeding machine for the automatic drafting machine. The pinch roller type paper feeding automatic drafting machine is disclosed in U.S. Pat. No. 4,384,298. The conventional pinch roller type paper feeding device disclosed in the foregoing patent, as shown in FIG. 8, is constructed in such a way that the paper 6 is sandwiched by the drive rollers 2 and the pressure rollers 4 by a pinch roller mechanism, and the paper 6 is fed in the X-coordinate axial direction by the rotary drive of the drive rollers 2 a writing implement 10 is fed in the Y coordinate axial direction on the guide plate 8, and a predetermined drawing is carried out on the paper on the guide plate 8.

Also, as shown in FIG. 6 and FIG. 7, an X-motor 14 is connected to an underlay roller 12, and the paper is sandwiched by the surfaces of the drive rollers 2, 2a at both end portions of the underlay roller 12 and the pressure rollers 16, 18. The drawing is carried out by the writing implement 10 on the paper 6 above the underlay roller 12.

In the case of the construction shown in FIG. 8 the writing implement 10 contacts the paper 6 on the guide plate 8 exerting a predetermined writing pressure. When the paper 6 is fed in $-X$ direction by the pinch roller mechanism, a blocking force is generated against the shifting of the paper 6 by the writing pressure of the writing implement, and the portion 6a of the paper 6 between the writing implement 10 and the pinch roller mechanism floats as shown in the drawing. When the paper 6 floats, the writing implement 10 is hooked on the floating portion 6a of the paper 6 which causes the paper to tear or an error to occur in the drawing. An object of this invention is to provide the floating of the paper 6 between the writing implement and the pinch roller mechanism.

Also, in case of the construction shown in FIG. 6, at the time of drawing, when the tip of the writing implement 10 resiliently contacts the paper 6 on the underlay roller 12, a feeding transfer speed of the portion of the paper 6 is deteriorated by the frictional force between the tip of the writing implement 10 and the paper 6 when compared with a feeding transfer speed of the portion of the paper 6 which is sandwiched by the pinch rollers. Because of this deterioration of the speed, the paper 6 is distorted which causes an error in the drawing that is undesirable. An object of this invention is to eliminate the delay of feeding of the portion of the paper to be fed by the pinch roller mechanism which is in resilient contact with the writing implement.

SUMMARY OF THE INVENTION

In order to achieve the foregoing objects, this invention is characterized in that while the pper is fed in a predetermined direction by the drive rollers and the pressure rollers that are in resilient contact with the drive rollers, a writing implement is shiftably disposed at a right angle to the feeding direction of the paper. The writing implement abuts on the paper, and a predetermined pattern is drawn on the paper by mutual operations of the transfer of the writing implement and the transfer of the paper in the feeding direction. Underlay rollers are disposed parallel to the transfer path immediately below the writing implement. The direction of drive and rotation of the underlay rollers is set identical with the drive and rotation direction of the drive rollers, and a circumferential speed of the surfaces of the underlay rollers is set slightly higher than a circumferential speed of the drive rollers.

As this invention has the foregoing construction, at the paper feeding time, the paper portion on the underlay rollers tends to advance at a faster speed than that of the paper portion on the drive rollers. However the load applied to the paper portion on the underlay rollers by the tip of the writing implement offsets just the increased speed component. Therefore, the feeding speed of the paper portion on the underlay rollers coincides with the feeding speed of the paper portion on the drive rollers.

Accordingly, at the drawing time, the floating or distortion of the paper on which the drawing is made can be prevented, and accurate drawing can be carried out which is an object of this invention.

DESCRIPTION OF THE PREFERRED EMBODIMENT

The construction of this invention will be described in detail in the following by referring to embodiments shown in the attached drawings.

Figure 1:
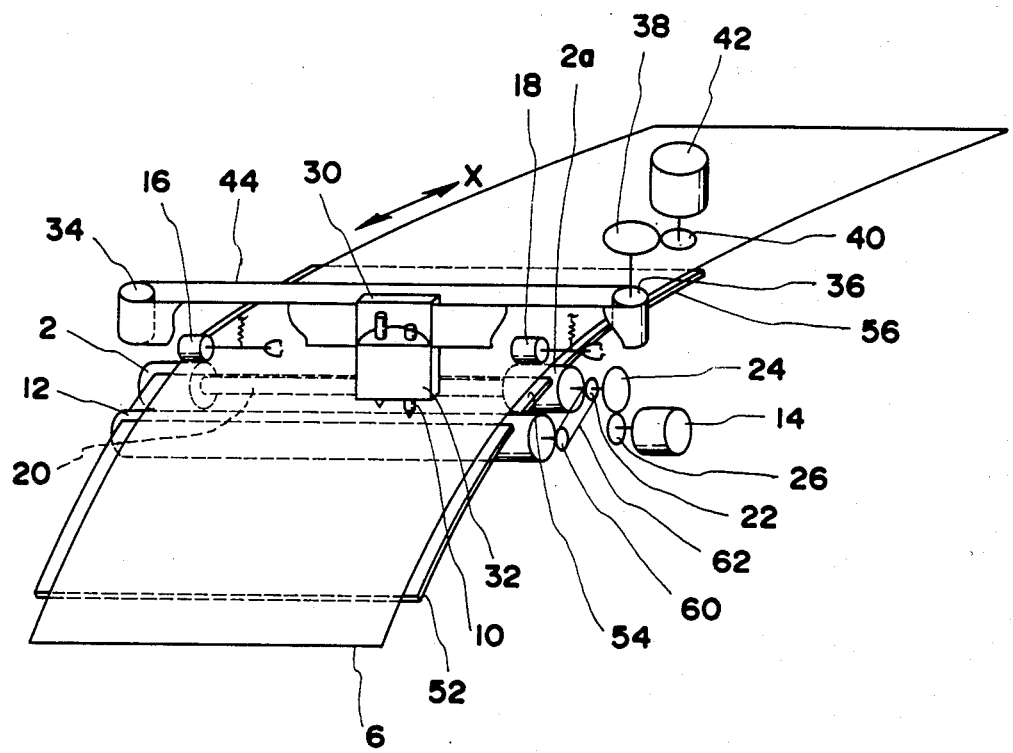
FIG. 1 is an explanatory perspective view showing a first embodiment of the drafting machine according to the invention.
Figure 2:
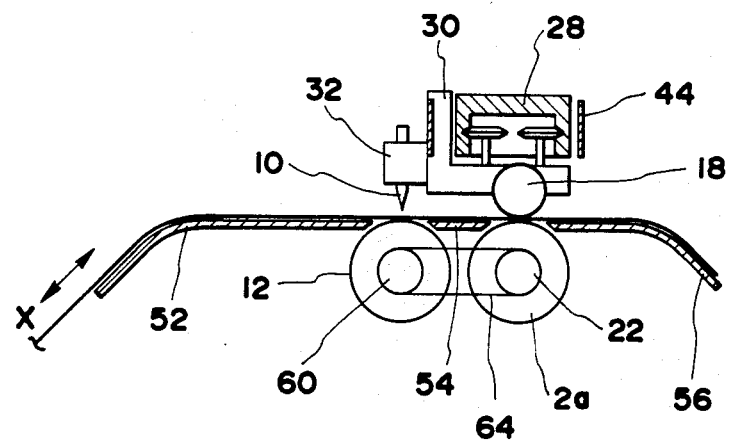
FIG. 2 is an explanatory side view showing the first embodiment of the drafting machine according to the invention.

In FIGS. 1 and 2, numeral 20 denotes a shaft rotatably supported on a machine frame (not shown), and the shaft is fixed to one end of the machine frame concentrically. A belt pulley 22 and a gear 24 are fixed to the shaft 20. The gear 24 meshes with a gear 26 fixed to an output shaft of an X motor fixed to the machine frame. At both ends of the shaft 20, are fixed drive rollers 2, 2a having mutually identical outside diameters. Numeral 28 denotes a Y rail (not shown in FIG. 1) fixed to the machine frame at a right angle to the feeding direction X of the paper 6. A Y cursor 30 is shiftably connected to the Y rail, and a drawing head 32 is connected to the Y cursor 30.

In the drawing head 32, a writing implement 10 is connected and supported on a lifting mechanism (not shown) located in the drawing head 32. Numerals 34 and 36 denote belt pulleys positioned at both ends of the Y rail 28 and axially supported on the machine frame so as to be rotatable. One belt pulley 36 is connected to a Y motor 42 by means of gears 38 and 40. The pulleys 34, 36 are spanned with an endless belt 44, and the Y cursor 30 is connected to the belt 44. Numerals 16 and 18 denote pressure rollers rotatably supported on the machine frame. The rollers are connected to the respective lifting mechanisms (not shown), and are in resilient contact with the surfaces of the drive rollers 2, 2a by the resilient force exerted by springs. Numerals 52, 54, 56 denote guide plates fixed to the machine frame.

At a portion immediately below of the opposed space portion between the guide plates 52 and 54, the underlay roller 12 is located and is rotatably supported on the machine frame. The upper end of the surface of the underlay roller 12 and the upper surfaces of the guide plates 52, 54 in the vicinity of the surface are set at almost an identical height. The abutting portions of the drive rollers 2, 2a and the pressure rollers 16, 18 are disposed in the opposed space portion between the guide plates 54 and 56. The transfer path of the writing implement 10 is formed immediately above the opposed space portion between the guide plates 52 and 54 and the underlay roller 12 along a longitudinal direction of the space portion and the roller 12. A pulley (60) is fixed concentrically to one end of the underlay roller 12, and an endless belt 64 is spanned between the belt pulley 60 and the belt pulley 22 fixed to the sshaft 20. The pulleys 22 and 60 have the same diameter, and the outside diameter of the underlay roller 12 is slightly larger the outside diameter of the drive rollers 2, 2a. Therefore, the speed of the circumferential surface of the underlay roller 12 is set to be slightly faster than the circumferential speeds of the drive rollers 2, 2a. A rope pulley may be used instead of the belt pulleys 22, 60 and an endless rope may be spanned between the rope pulleys.

The operation of this embodiment will be described in the following.

Figure 3:
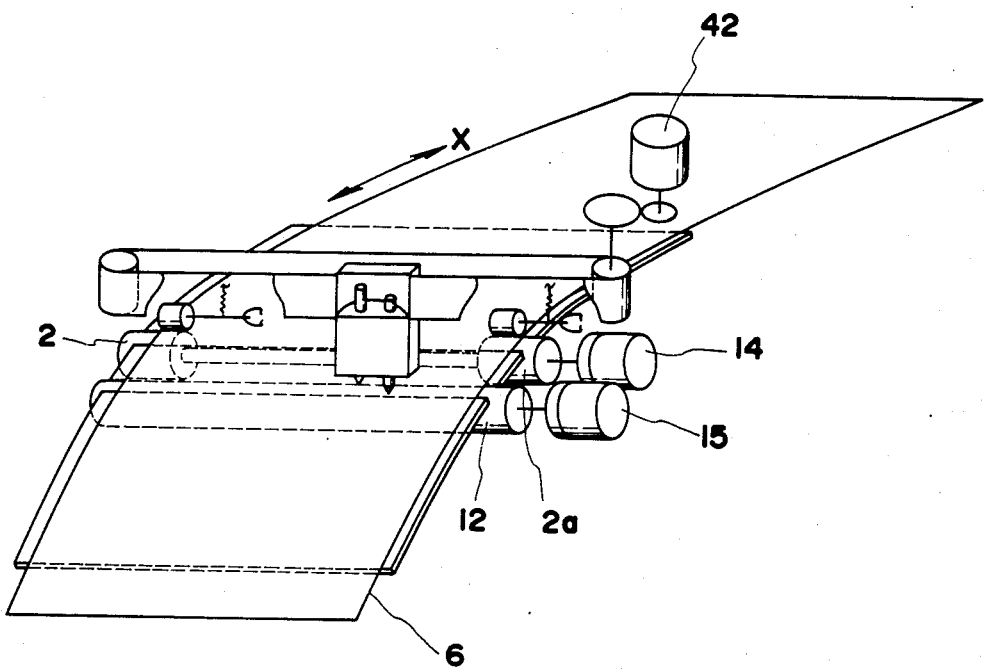
FIG. 3 is an explanatory perspective view of the second embodiment.

The paper 6 is mounted on the guide plates 52, 54 and 56, and the paper is inserted and disposed between the drive rollers 2, 2a and the pressure rollers 16, 18. The X motor is driven by a controller (not shown), and the paper 6 is fed to the right and left as seen in FIG. 2 (X-coordinate axial direction) along the surfaces of the guide plates 52, 54, 56 by rotation of the drive rollers 2, 2a. The rotation of the drive rollers 2, 2a is transmitted to the underlay rollers 12 by means of the belt pulley 22, belt 64 and belt pulley 60. The underlay roller 12 is rotated at a slightly higher circumferential speed than the circumferential speed of the drive rollers and in the same direction as the drive rollers 2, 2a. On the other hand, the Y motor 42 is driven by the controller, and the belt 44 is rotated in forward and reversed directions between the pulleys 34 and 36. Interlocked with the rotation of the belt 44, the head 32 is shifted in the Y direction along the Y rail 28. The controller controls the lifting of the writing implement 10, and when the writing implement 10 is descended, the tip of the writing implement 10 abuts on the paper 6 on the underlay roller 12 by the predetermined pressure. The writing pressure of the writing implement 10 against the paper 6 is received by the surface of the underlay roller 12. When the writing implement 10 exerts pressure on the underlay roller 12 by means of the paper 6, the rotating force of the underlay roller 12 is transmitted to the paper 6, and the paper 6 is fed in the right and left directions in FIG. 2 by the rotating motion of the underlay roller 12 and the rotating motion of the drive rollers 2, 2a. At this time, since the circumferential speed of the underlay roller 12 is slightly faster than the circumferential speeds of the drive rollers 2, 2a, the portion of the paper abutting on the writing implement 10, namely, the portions of both side of the paper, tends to advance at a slightly faster speed than that of the portion of the paper sandwiched by the pinch roller mechanism. This increased speed element cancels out the decreased speed element caused by the reduction of speed of the paper due to the frictional force of the paper 6 and the tip of the writing implement 10. Therefore the transfer speed of the portion of the paper 6 abutting on the writing implement 10 coincides with the transfer speed of the portions of both sides of the paper and the paper 6 is prevented from distorting. Particularly, in FIG. 2, when the paper 6 is shifted to the left, the portion of the paper 6 abutting on the writing implement 10 is transmitted with the drive force from the underlay roller 12 so that the paper 6 never floats between the writing implement 10 and the pinch roller mechanism. Accordingly, means for creating circumferential speed of the surface of the underlay roller slightly higher than the circumferential speed of the drive rollers can be adopted from various constructions other than those disclosed in the foregoing embodiments. For example, in FIG. 1 and FIG. 2, the outside diameter of the underlay roller 12 and the outside diameter of the drive rollers 2, 2a may be identical with the outside diameter of the pulley 22 set to be larger than the outside diameter of the pulley 60. Also, as shown in FIG. 3, the drive rollers 2, 2a are driven by the X motor 14, and the underlay rollers 12 may be driven by a separate motor 15, and if the rotating speeds of the motors 14, 15 are properly controlled by the controller, even though the outside diameters of the underlay roller 12 and the drive rollers 2, 2a are the same, the circumferential speed of the underlay roller 12 can be made higher than the circumferential speeds of the drive rollers 2, 2a.

Figure 4:
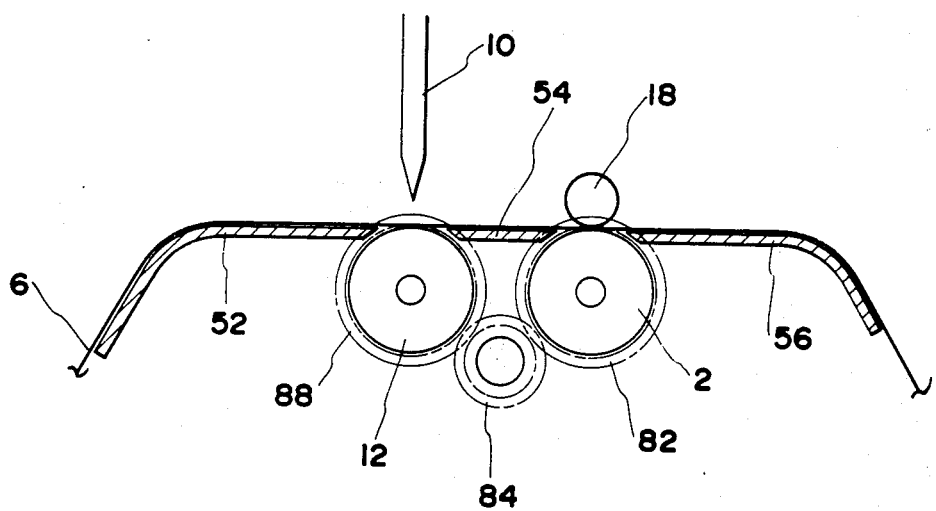
FIG. 4 is an explanatory side view showing a third embodiment of the drafting machine according to the present invention.

Another embodiment of this invention will be described in the following by referring to FIG. 4.

Numeral 2 denotes a pair of rotatably supported drive rollers whose diameters are identical, and a gear 82 is fixed to the shaft of the rollers. The gear 82 meshes with a gear 88 fixed to the shaft of the underlay roller 12 by means of a gear 82 rotatably supported on the machine frame. The outide diameter of the underlay roller 12 has a slightly large diameter than the outside diameter of the drive roller 2. The shaft fixed to the gear 84 is connected to an output shaft of the X motor (not shown). The gears 82 and 88 are set so that the diameter of the pitch circle and the number of gears are the same. In the drawing, numeral 18 denotes a pressure roller, and 10 denotes a writing implement.

In the foregoing construction, when the gear 84 is driven by the X motor, the drive force is transmitted to the gears 82 and 84, and the underlay roller 12 is rotated in the rotating direction identical with that of the drive roller 2 and at a slightly faster circumferential speed than the circumferential speed of the driver roller 2. The increased speed component of the underlay roller 12 compensates for the delay of transfer by the frictional force of the paper 6 with the writing implement 10. In FIG. 4, the outside diameter of the underlay roller 12 and the outside diameter of the drive roller 2 are identical. The gear 82 has a pitch circle with larger diameter than that of the gear 88 whereby the circumferential speed of the underlay roller 12 can be made higher than the circumferential speed of the drive roller 2.

Figure 5:
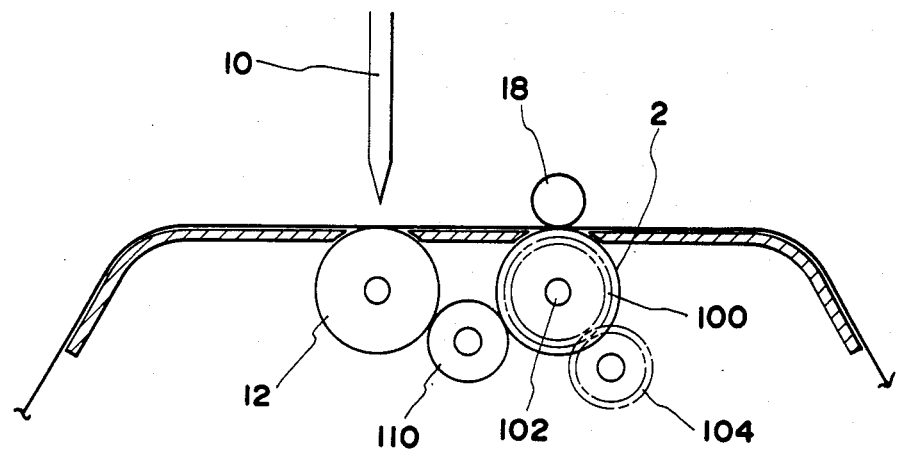
FIG. 5 is an explanatory side view of the fourth embodiment.

Another embodiment of the means for making the circumferential speed of the underlay roller 12 faster than the circumferential speed of the drive roller 2 is described by referring to FIG. 5.

Numeral 100 denotes a gear fixed to a shaft 102. The gear 100 meshes with a gear 104 connected to the output shaft of the X motor (not shown). The drive roller 2 is fixed to the shaft 102. Numeral 12 denotes the underlay roller rotatably supported on the machine frame. An intermediate roller 110 is rotatably disposed between the underlay roller 12 and the drive roller 2. The intermediate roller 110 is in resilient contact on each surface of a rollers 12 and 2 by the predetermined pressure. The outside diameter of the underlay roller 12 is formed slightly smaller than the outside diameter of the drive roller 2.

Figure 6:
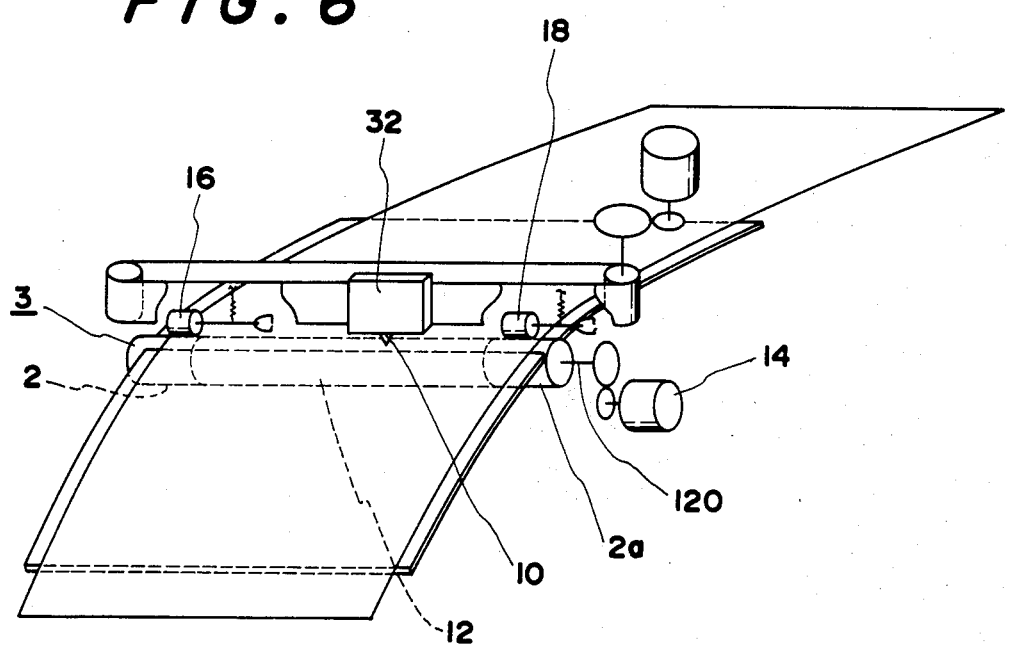
FIG. 6 is an explanatory perspective view showing a fifth embodiment of the drafting machine according to the present invention.
Figure 7:
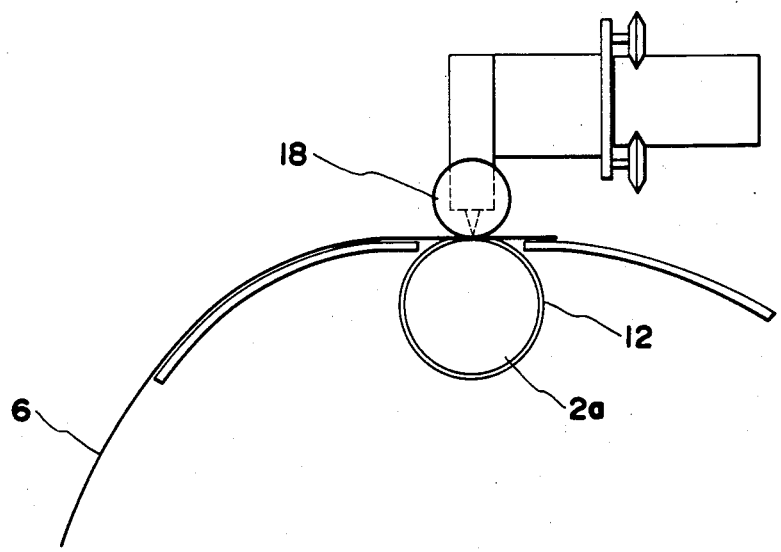
FIG. 7 is an explanatory side view showing a fifth embodiment.
Figure 8:
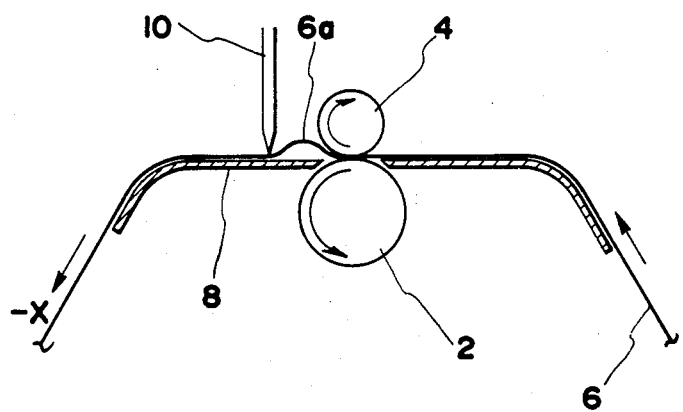
FIG. 8 is an explanatory side view showing a conventional drafting machine.

In the foregoing construction, the rotation of the drive roller 2 is frictionally transmitted to the underlay roller 12 by means of the intermediate roller 110. The underlay roller 12 rotates at a slightly faster speed than that of the drive roller in the same direction. A roller separate from the drive roller 2 is fixed to the shaft 102, and the intermediate roller may be set in a pressure contact condition with the separate roller. This invention is not limited particularly to an automatic drafting machine in which the drive roller and the underlay roller are provided on the separate shafts. As shown in FIG. 6, it can be applied to an automatic drafting machine in which the drive rollers 2, 2a and the underlay roller 12 are integrally formed on the drum 3 fixed to a shaft 120. In the automatic drafting machine, the drawing head 32 is shiftably disposed along the axial direction of the underlay roller 12. The writing implement 10 of the drawing head 32 abuts on the paper over the underlay roller 12 by a predetermined pressure. The outside diameter of the underlay roller 12 is formed slightly larger than the outside diameters of the drive rollers 2, 2a. The shaft 120 is connected to the output shaft of the X motor 14 by gears. Other constructions identical with those of the automatic drafting machine of double-shaft structure are shown in FIG. 1.

What is claimed is:

1. A paper feeding device for an automatic drafting machine comprising:
    a pinch roller mechanism for feeding said paper along a transfer path at a first speed, said pinch roller mechanism comprised of drive roller means, pressure roller means in paper pressing engagement with said drive roller means and means connected to said drive roller means for driving said drive roller means;
    means in operative association with said pressure roller means for resiliently biasing said pressure roller means toward said drive roller means;
    a drawing head and means adjacent said pinch roller mechanism for shifting said drawing head along a direction transverse to said transfer path;
    a writing implement and means liftably supporting said writing implement on said drawing head whereby said writing implement may be raised and lowered onto said paper;
    underlay roller means rotatably mounted below said writing implement to feed said paper along said transfer path at a second speed greater than said first speed to offset frictional forces exerted on said paper by said writing implement and maintain a substantially uniform tension on said paper when said writing implement is lowered onto said paper during transfer of said paper along said transfer path.

2. A paper feeding device as claimed in claim 1 wherein said means connected to said drive roller means comprises a mechanism operatively connected to said underlay roller means for driving said underlay roller means.

3. The paper feeding device as claimed in claim 2 wherein said mechanism connected to said underlay roller means is comprised of a first pulley means mounted to said drive roller means, a second pulley means mounted to said underlay roller means and a belt reeved around said first and second pulley means.

4. The paper feeding device as claimed in claim 1 wherein said underlay roller means has an outer diameter that is larger than the outer diameter of said driver roller means.

5. The paper feeding device as claimed in claim 3 wherein said underlay roller means has an outer diameter that is larger than the outer diameter of said drive roller means.

6. The paper feeding device as claimed in claim 2 wherein said mechanism connected to said underlay roller means is comprised of a gear train.

7. The paper feeding device as claimed in claim 1 wherein said means connected to said drive roller means is comprised of a first motor means to drive said drive roller means at said first speed;
    and said device further comprising a second motor means operatively connected to said underlay roller means to drive said underlay roller means at said second speed.

8. The paper feeding device as claimed in claim 1 wherein said drive roller means and said underlay roller means are mounted on the same shaft.

9. The paper feeding device as claimed in claim 8 wherein said underlay roller means has an outer diameter larger than that of the outer diameter of the drive roller means.

* * * * *